United States Patent [19]
Pitt et al.

[11] Patent Number: 5,094,675
[45] Date of Patent: Mar. 10, 1992

[54] PROCESS FOR REMOVING DUST FROM A DUST-LADEN GAS USING A GAS-PERMEABLE FILTER ELEMENT ARRANGED IN A CONTAINER

[75] Inventors: Reinhold U. Pitt, Aachen; Hubert Steven, Gummersbach, both of Fed. Rep. of Germany

[73] Assignee: L. & C. Steinmüller GmbH, Gummersbach, Fed. Rep. of Germany

[21] Appl. No.: 328,153

[22] PCT Filed: Mar. 30, 1988

[86] PCT No.: PCT/EP88/00264
§ 371 Date: Jan. 27, 1989
§ 102(e) Date: Jan. 27, 1989

[87] PCT Pub. No.: WO88/07404
PCT Pub. Date: Oct. 6, 1988

[30] Foreign Application Priority Data
Mar. 30, 1987 [DE] Fed. Rep. of Germany ....... 3709990
Jun. 5, 1987 [DE] Fed. Rep. of Germany ....... 3718846

[51] Int. Cl.$^5$ .............................................. B01D 46/04
[52] U.S. Cl. ........................................... 55/21; 55/96; 55/302
[58] Field of Search ................. 55/21, 96, 213, 273, 55/283, 284, 302, 341.1, 361

[56] References Cited

U.S. PATENT DOCUMENTS

| | | | |
|---|---|---|---|
| 2,892,512 | 6/1959 | Watts et al. | 55/213 |
| 4,500,326 | 2/1985 | Sunter | 55/21 |
| 4,507,130 | 3/1985 | Roth | 55/96 |
| 4,624,689 | 11/1986 | Volk et al. | 55/283 X |
| 4,718,924 | 1/1988 | DeMarco | 55/302 |

FOREIGN PATENT DOCUMENTS

0015409 10/1982 European Pat. Off.
82418 12/1973 Fed. Rep. of Germany.
228176A1 10/1985 German Democratic Rep.

Primary Examiner—Charles Hart
Attorney, Agent, or Firm—Robert W. Becker & Associates

[57] ABSTRACT

A method of removing dust from a dust-laden gas using gas-permeable filter elements that are disposed in tanks, with the gas flowing through the filter elements from the outside to the inside thereof and depositing dust on the outer surfaces thereof. Deposited dust is removed from the filter elements by pressurized gas cleaning pulses applied to the interior of the filter elements. A plurality of tanks are supplied in parallel with partial streams of the dust-laden gas. The ratios of the pressure differentials that occur across the filter elements to the flow rates of the individual partial streams, which ratios increase with time during the formation of a dust layer, are determined. When the ratio of one of the tanks reaches an experimentally determined limiting value, this tank and all of the other tanks are simultaneously cleaned.

7 Claims, 4 Drawing Sheets

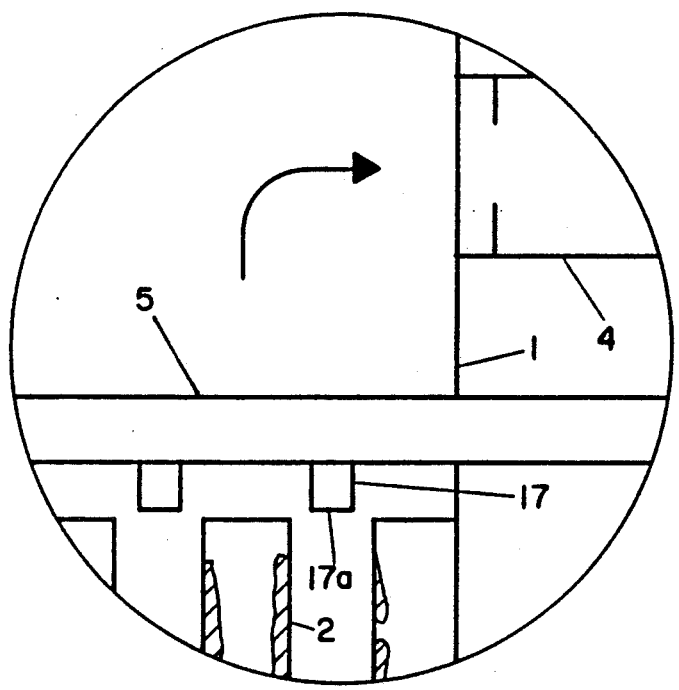
FIG—4
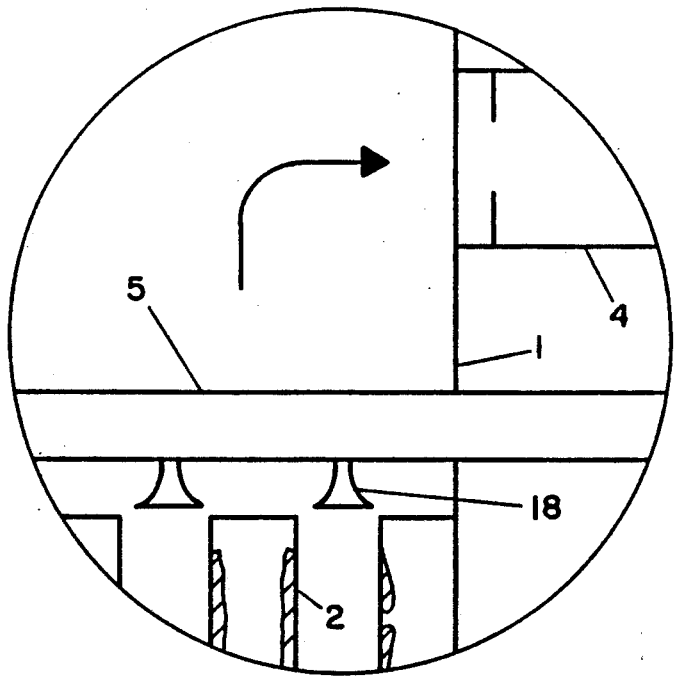
FIG—5

PROCESS FOR REMOVING DUST FROM A DUST-LADEN GAS USING A GAS-PERMEABLE FILTER ELEMENT ARRANGED IN A CONTAINER

BACKGROUND OF THE INVENTION

The present invention relates to a method of removing dust from a dust-laden gas using gas-permeable filter elements that are disposed in at least one tank, with the gas flowing through the filter elements from the outside to the inside thereof and depositing the dust on the outer surfaces of the filter elements, and with the deposited dust being removed from the filter elements by compressed or pressurized gas pulses that are applied to the interior of the filter elements, whereby the gas pulses are released at least as a function of a pressure differential that is measured across the filter elements.

Such a method is used, for example, for cleaning dust-laden flue gases from pressurized or atmospheric fluidized bed reactors. In this connection, customarily a plurality of tanks are supplied in parallel with the flue gas that is to be cleaned. Since only the pressure differential across the filter cartridges is determined and the cleaning pulses are released by the pressure differential as a function of reaching a prescribed limiting value, a cleaning or dust-removal is also effected at pressure differentials that are not based upon the formation of a sufficiently thick layer upon the filter elements, but rather upon changes in the flow rate. Thus, the cleaning pulses are also released when no layer is present or where the layer is to thin.

It is an object of the present invention to provide a method with which the release of the cleaning pressure pulses is essentially effected only as a function of the formed dust layers.

SUMMARY OF THE INVENTION

This object is realized in that for the tank, in addition to the pressure differential over the filter elements, the flow rate of the gas that is to be cleaned is determined, and the cleaning pulse is released when the ratio of the pressure differential to the flow rate, which ratio increases with time during the formation of the dust layer, reaches t least one experimentally determined lower limiting value.

The pressure drop caused by the gas flowing over the filter elements can be determined in conformity with the following Darcy formula:

$$\Delta p = \frac{V \cdot \eta \cdot L}{A_F \cdot D_S} \quad (1)$$

where:

V is the flow rate of the gas that is to be cleaned,
$\eta$ the viscosity of the gas that is to be cleaned,
L the thickness of the dust layer + the thickness of the filter wall,
$A_F$ the surface area of the filter,
$D_S$ a material constant of the dust.

This equation can be found, for example, in "Chemical Engineers' Handbook", 5th Ed. (Intern. Students Ed.), McGraw-Hill (1973) pages 5-54.

The flow rate can be measured, for example, by introducing a restrictor in the cleaned gas stream and by determining the pressure differential across the restrictor. In a manner known per se, the flow rate is proportional to the square root of the pressure differential measured across the restrictor.

Thus, from equation (1) the ratio $$\frac{\Delta p}{V} \quad (2)$$

can be determined, and can be compared with an experimentally determined fixed value.

This ratio increases during the cleaning operation, and it is possible to experimentally determine the limiting value at which it is expedient to release the cleaning pulse. The method of the present invention prevents cleaning pulses from being released merely by changes in flow rate, or where the thickness of the layer is still too small.

The intensity of the cleaning pulse is essentially determined by the cohesive force of the dust particles that form the layer, and by the pressure differential that is formed across the filter elements and is directed from the outside toward the inside. In this connection, it is advantageous if as a function of the pressure differential that is obtained across the filter elements, the pressure of the supplied cleaning gas be set in such a way that the intensity of the cleaning pulses is adequate for cleaning or dust removal. The ratio, and hence the intensity, are experimentally determined.

If the quantity of the dust-laden gas that is to be cleaned makes it necessary to use a plurality of tanks, it is advantageous that with this plurality of tanks, which are supplied in parallel with partial streams of the gas that is to be cleaned, the ratios of the pressure differentials across the filter elements of the individual tanks to the flow rates of the individual partial streams, which ratios increase with time during the formation of the dust layer, be determined and when the ratio at one of the tanks reaches an experimentally determined limiting value, this tank and all of the other tanks are simultaneously cleaned.

With the use of a plurality of tanks that are supplied in common, the pressure differential that is obtained across the individual tanks is determined by the pressure differential across the filter elements disposed in the filter tank and by the pressure differential that is associated with the individual tanks as a result of the distributors, collectors, and connecting channels that are required. In other words, as a consequence of the varying deposition of dust upon the filter elements of the various tanks, an unequal distribution of the flue gas that is to be cleaned to the various tanks is obtained. If now the tanks were to be cleaned independently of one another and after one another in time, the danger exists that due to the increased flow velocity through that tank that has just been cleaned, the pressure differential attributed to the pressure differential of the untreated and clean gas channels, the distributor, and the collector, increases unnecessarily.

With the simultaneous cleaning of the filter tanks, a uniform distribution of the dust-laden gases to the filter tanks, and hence the lowest possible velocity, is achieved. The increase in pressure loss is then caused only by the pressure differential that is attributed to the filter elements.

It is furthermore advantageous if the pressure gas pulse is applied to the interior of the individual filter elements via a jet or nozzle that opens in the vicinity of the outlet opening of the filter element or extends into this filter element.

It is furthermore preferred that a jet be used that widens in a diffuser-like manner in a direction toward the outlet opening of the filter element, this jet preferably being one that widens exponentially.

The use of a jet prevents the pressure pulse from expanding spherically from the discharge opening provided on the previous discharge tube; instead, the pressure pulse is introduced in a directed manner into the filter element.

BRIEF DESCRIPTION OF THE DRAWINGS

The method of the present invention will now be described in detail with the aid of the accompanying drawings, in which:

FIG. 4 is a partial view comparable to FIG. 1 showing jets or nozzles provided on the discharge tubes, and FIG. 5 is a view similar to FIG. 4 with a jet or nozzle that is widened in the manner of a diffuser.

DESCRIPTION OF PREFERRED EMBODIMENTS

With a pressurized fluidized bed, a number of filter elements 2 are disposed in a pressure tank 1 in such a way that the filter elements receive from the outside, via a line 3, a flow of dust-laden flue gas that is under a pressure ($p_1$). Although the flue gas passes into the interior of the filter elements 2, the dust remains as a layer S on the outside of the filter elements. The cleaned flue gas, which is under a lesser pressure ($p_2$), flows into a collection chamber and leaves the tank via a clean gas line 4.

After a certain layer thickness has built up, the filter elements must be cleaned off. This is effected by subjecting the interior of the filter elements 2 to a pressure pulse.

Figure 1:
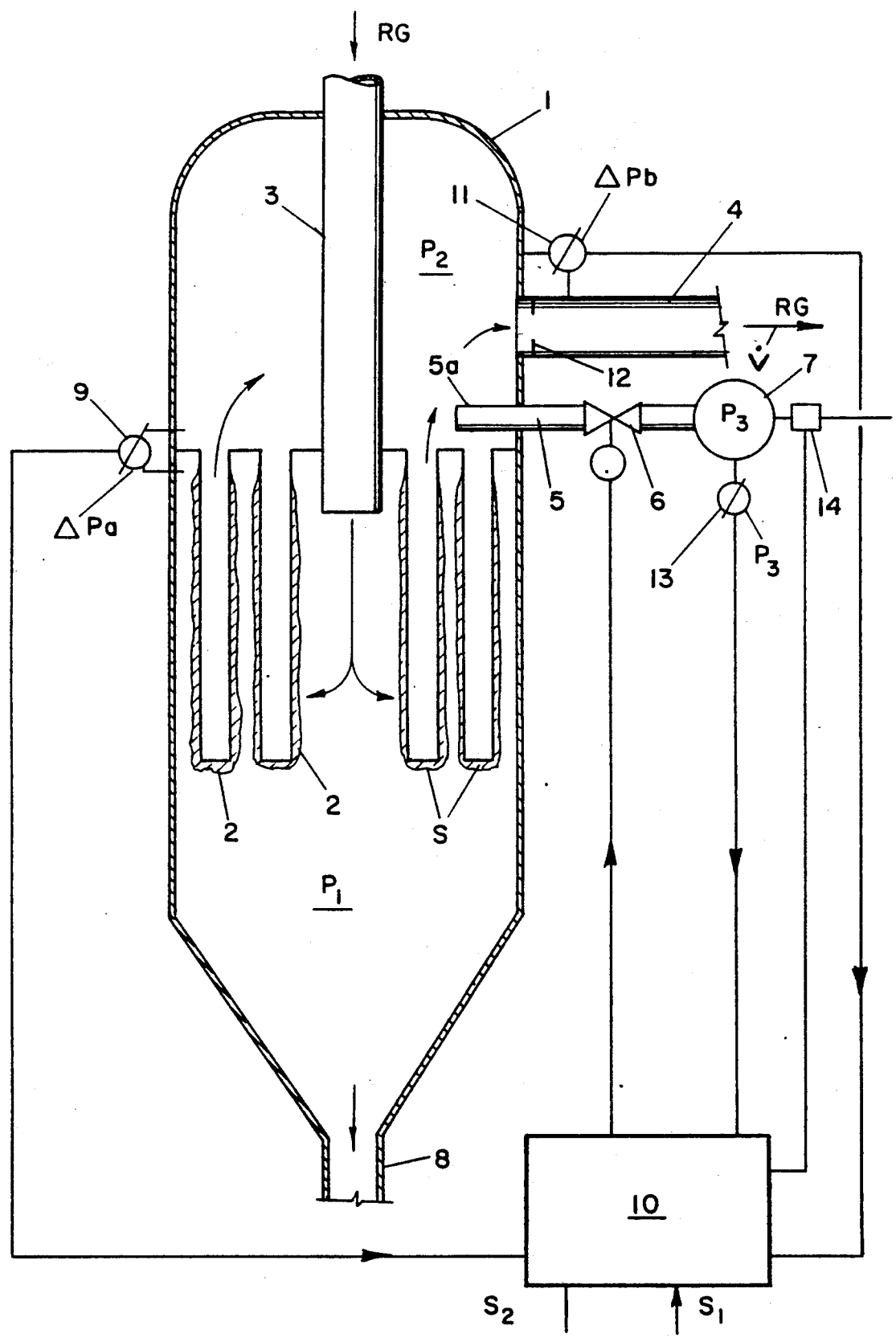
FIG. 1 is a schematic longitudinal cross-sectional view through a pressure tank that is equipped with filter elements, including those gauges or measuring points that are necessary for carrying out the method with, for example, a charged fluidized bed reactor.

To simplify illustration, a cleaning apparatus is shown associated only with that filter element 2 that is illustrated to the right in FIG. 1. This cleaning apparatus comprises a compressed or pressurized gas tube 5 that has a discharge opening 5a which is directed toward the interior of the filter element. The pressurized gas tube is connected via a solenoid valve 6 to a compressed or pressurized gas tank 7, which is under a pressure ($p_3$).

If the solenoid valve 6 is opened, a pressure pulse is introduced into the interior of the filter element that is of such an intensity that the dust cake on the outside of the filter element is removed. The intensity of the pressure pulse must be great enough that the cohesive force of the dust layer, and the pressure differential between ($p_1$) and ($p_2$) that is directed against the pressure pulse, are overcome. The dust that is removed is withdrawn via the dust discharge 8.

As can be seen from FIG. 1, the pressure differential $\Delta p_a = p_1 - p_2$ is measured by a pressure differential indicator 9, and the corresponding pressure signal is fed to a control and regulating unit 10. Furthermore, via a pressure differential indicator 11, the differential pressure is measured over a restrictor 12 that is disposed in the clean gas line 4. This differential pressure $\Delta p_b$ is a measure for the flow rate V of the flue gas that flows through the pressure tank 1 in conformity with the following equation $$\dot{V}_{RG} \sim \sqrt{\Delta p_b} \tag{3}$$

The output signal of the differential pressure indicator 11 is also fed to the control and regulating unit 10, to which is further fed an experimentally determined lower limiting value as a theoretical value $S_1$. If during the operation the ratio of $\Delta p_S / \dot{V}_{RG}$ reaches this limiting value, the solenoid valve 6 is activated.

In order as a function of the pressure differential $\Delta p_a$ to be able to subject the filter element 2 to a cleaning pressure pulse of adequate intensity, the tank pressure ($p_3$) is measured by a measuring device or indicator 13. The control and regulating unit 10 forms the ratio between the pressure ($p_3$) and the outer pressure ($p_1$) of the filter elements, and compares this ratio with an experimentally determined theoretical value $S_2$ that is transmitted to the control and regulating unit. If the pressure ($p_3$) is inadequate, the tank 7 is furnished with a greater pressure from a pressure source, which is not illustrated in FIG. 1, via a pressure-regulating valve 14. Thus, triggering of the solenoid valve 6 is preferably effected only when the pressure ratio $p_3/p_1$ has reached the experimentally determined value $S_2$.

Figure 2:
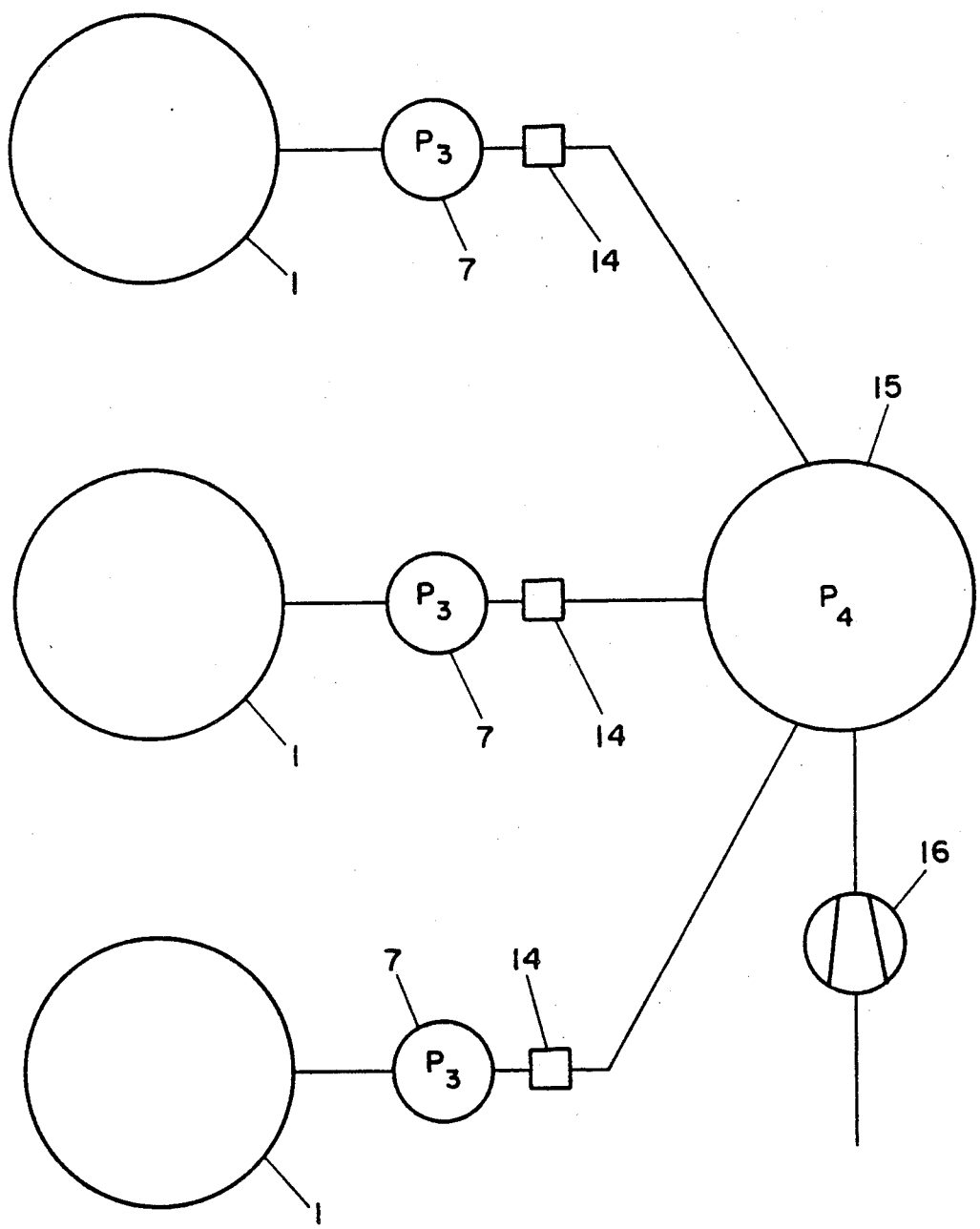
FIG. 2 is a schematic view to explain a preferred preparation of the cleaning or removal pressure for several pressure tanks.

FIG. 2 schematically illustrates how the cleaning pressure supply tanks 7 of a plurality of pressure tanks 1 can be supplied with the required cleaning pressure from a main tank 15. By means of a compressor 16, the tank 15 is held at a pressure ($p_4$) that suffices for setting all possible pressure values ($p_3$). Each of the pressure tanks 1 is provided with the network illustrated in FIG. 1.

The operation of the measured values and the transmitted theoretical values in the control and regulating unit in the context of the present invention need not be described in greater detail since such operations are known.

The pressure differential across the filter elements 2 can be increased by a pressure fan disposed upstream of the line 3 or by an induced-draft blower disposed downstream of the clean gas line 4. This concerns only the increase of the pressure differential across the filter elements.

Figure 3:
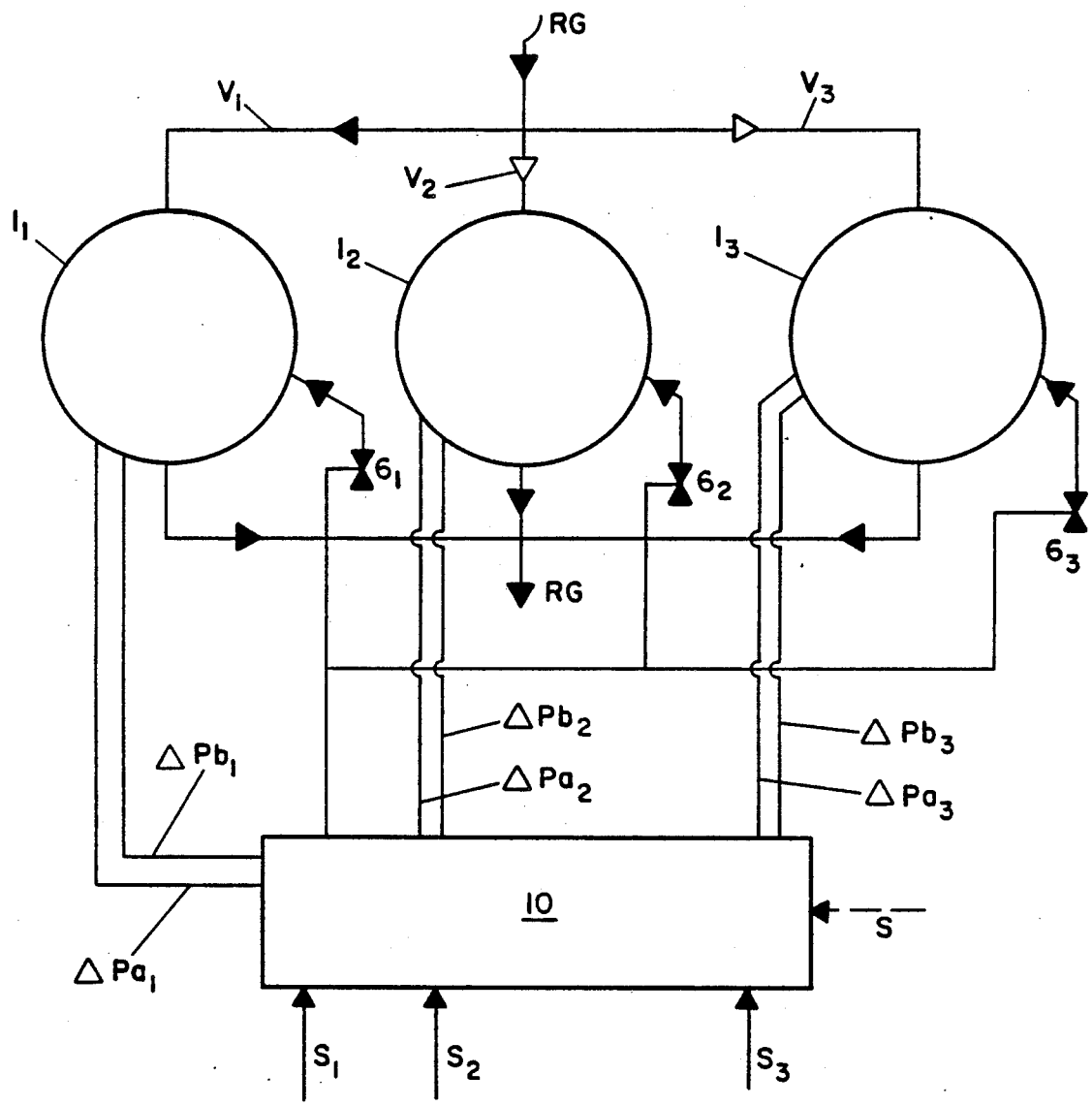
FIG. 3 is a schematic view to explain the cleaning or removal operation with a plurality of tanks that are supplied in parallel.

FIG. 3 illustrates a cleaning apparatus having three tanks $1_1$, $1_2$, $1_3$ that are supplied in parallel by the flue gas RG that is to be cleaned. Associated with the tanks are the measuring devices or indicators 9 and 11, and corresponding pressure signals $\Delta p_{ai}$ and $\Delta p_{bi}$, where $i = 1, 2,$ and 3, are fed to the control and regulating unit 10. The solenoid valves $6_1$, $6_2$, and $6_3$ can be controlled by this unit.

From the pressure differentials fed to it, the control and regulating unit continuously determines the ratios $\Delta p_{ai}/\dot{V}_i$, where $i = 1, 2,$ and 3, and compares these ratios with a limiting value $S_i$ that is prescribed for the individual tanks. If the tanks are essentially identical in construction, the determined limiting values $S_i$ are essentially equal, so that a common limiting value S can be prescribed for all of the tanks. If one of the ratios reaches this limiting value, all of the solenoid valves $6_1$, $6_2$, and $6_3$ are activated, so that the tanks are simultaneously cleaned.

Whereas in FIG. 1 illustrated merely schematically is only a single compressed or pressurized gas tube 5 with one discharge opening 5a that is directed toward the interior of the filter element, FIGS. 4 and 5 illustrate a compressed or pressurized gas tube 5 that extends over several filter elements 2. In the embodiment illustrated in FIG. 4, several linear jets or nozzles 17 are connected to the pressurized gas tube 5, with the discharge opening 17a being disposed in the vicinity of the outlet opening of the filter element 2. The jets 17 can also extend into the individual filter elements. This embodiment prevents the formation of a spherical pressure pulse wave as occurs at the opening 5a of FIG. 1; in other words, with this embodiment the cleaning pulse is transmitted better into the individual filter element.

In the embodiment illustrated in FIG. 5, connected with the compressed or pressurized gas tube are individual jets or nozzles 18 that are embodied in a diffuser-like manner and that are each also associated with a filter element 2. Also with this embodiment of the jets is a better utilization of the cleaning pulse achieved.

The present invention is, of course, in no way restricted to the specific disclosure of the specification and drawings, but also encompasses any modifications within the scope of the appended claims.

We claim:

1. In a method of removing dust from a dust-laden gas using gas-permeable filter elements that are disposed in at least one tank, with said gas flowing through said filter elements from the outside to the inside thereof and depositing said dust on the outer surfaces of said filter elements, and with said deposited dust being removed from said filter elements by pressurized gas cleaning pulses that are applied to the interior of said filter elements, whereby the pressure differential that occurs across the filter elements is measured and, for said tank, in addition to said pressure differential across said filter elements, the flow rate of the dust-laden gas is determined, and the cleaning pulse is released when the ratio of the pressure differential to the flow rate, which ratio increases with time during the formation of a dust layer on said filter elements, reaches at least one limiting value, the improvement wherein:

a plurality of tanks are supplied in parallel with partial streams of said dust-laden gas;

the ratios of the pressure differentials across said filter elements, to the flow rates, of the individual partial streams, which ratios increase with time during the formation of dust layers on said filter elements, are determined; and when the determined ratio of one of said tanks reaches an experimentally determined limiting value, this tank and all of the other tanks are simultaneously cleaned by pressurized gas cleaning pulses that are supplied to the interior of the individual filter elements.

2. A method according to claim 1, which includes the step of setting the pressure of said cleaning gas as a function of said pressure differentials that are obtained across said filter elements in such a way that the intensity of said cleaning pulses is sufficient to effect cleaning.

3. A method according to claim 1, which includes the step of providing jet means to apply said pressurized gas pulses directly to the interior of the individual filter elements.

4. A method according to claim 3, in which said jet means open out in the vicinity of outlet openings of said filter elements.

5. A method according to claim 3, in which said jet means extend into said filter elements.

6. A method according to claim 3, in which said jet means widen in a diffuser-like manner in a direction toward outlet openings of said filter elements.

7. A method according to claim 3, which includes the step of providing jet means to apply said pressurized gas pulses directly to the interior of each of the individual filter elements.

* * * * *